Oct. 24, 1933.  F. T. CHESNUT  1,931,644
METHOD AND MECHANISM FOR REMOVING REACTANCES
Filed Feb. 26, 1929
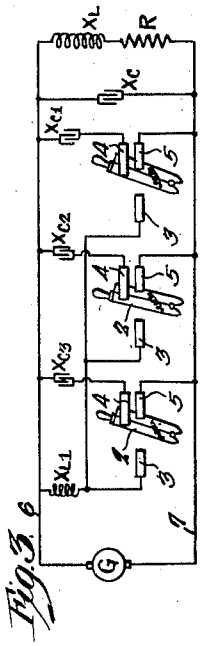
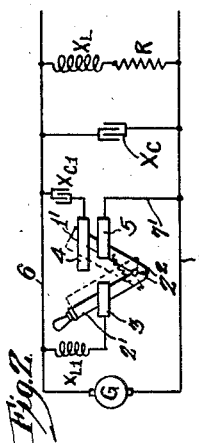
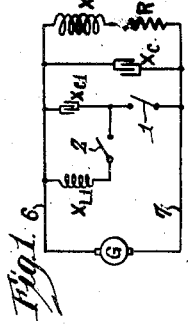
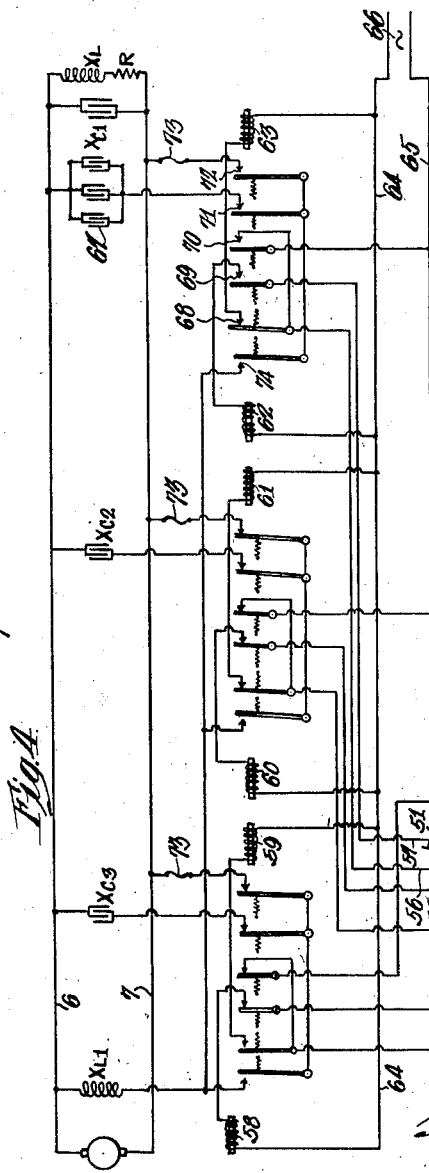
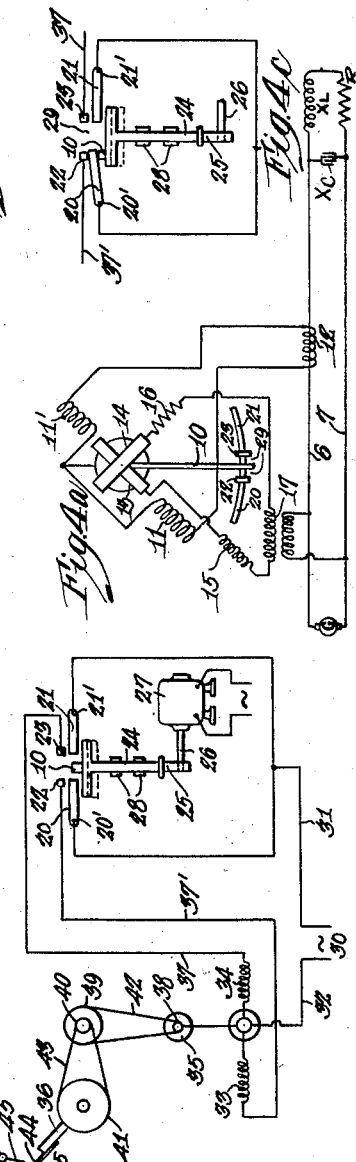
Inventor
Frank T. Chesnut
by
Attorney Patented Oct. 24, 1933

1,931,644

UNITED STATES PATENT OFFICE 1,931,644

METHOD AND MECHANISM FOR REMOVING REACTANCES

Frank T. Chesnut, Trenton, N. J., assignor to Ajax Electrothermic Corporation, Ajax Park, N. J., a corporation of New Jersey Application February 26, 1929. Serial No. 342,879

8 Claims. (Cl. 172—246)

My invention deals with the adjustment and control of the induction current supply to a load of widely changing inductance and finds its best illustration within my knowledge and use in the operation and control of induction electric furnaces. It affords a very excellent method for the elimination of out of phase currents through the generator and feed line incident to changing reactance of the load, due for example to changing conditions at an induction furnace.

Keeping this illustration in mind:—

In an induction electric furnace where the reactance of the coil varies with the heating or melting conditions, the condenser reactance necessary to balance the inductive reactance must necessarily vary also. Where the induction furnace is used for melting a metallic charge the variation may be considerable. Especially when working with charges which are magnetic at temperatures below the recalescence point, if the power factor were uncorrected it would vary over an extreme range and make necessary the use of a generating plant capable of carrying a load including the very large maximum current out of phase with the generator voltage, in addition to the requisite and relatively far smaller in-phase current.

Prior to my invention devices of various sorts have been used to vary the balancing reactance and to control power factor.

A changing power factor can be corrected by throwing the requisite reactance units (which may be either of capacity or inductance) into or out of parallel circuit with the furnace coil but in the past this has resulted in disadvantageous arcing at the breaking switch or else has required an undue dropping of voltage on the system in order to avoid the arcing, the arcing taking place when the reactance unit or units are cut out of circuit.

My invention provides a means for avoiding objectionable arcing when regulating power factor by throwing condensers or banks of condensers out of parallel circuit with the load of changing reactance.

My method lends itself well to slow manual operation, to semi-automatic and to complete automatic operation, and does away with the need for an operator who has hitherto had to see that out of phase loading does not exceed some set and predetermined limit above which heating would be disadvantageously high—and thereby gives the furnace an adaption to be operated economically at higher loads.

One purpose of my invention is to provide a commercially feasible and efficient method for adding to or taking out reactance units, preferably condensers, from a system in order to vary the power factor on an alternating current load.

A further purpose is to adapt this same method to multiple condenser units or banks of condenser units so that the requirements of apparatus may be lessened; and so that one balancing reactance may be used to break the connections to a plurality of other opposite reactances.

A further purpose is to make the method remotely controlled by the use of control wires and magnets.

A further purpose is to adapt the method to semi-automatic or completely automatic control so that the operations of maintaining any desired power factor can be accomplished without the aid of operators.

My invention embodies not only methods but apparatus by which the methods may be carried out.

In compliance with the statutes I have chosen to illustrate my invention by the use of diagrams, but realizing the impossibility of covering all variations of the main idea will use these diagrams to illustrate the method rather than to show many particular cases. It is obvious, for instance, that either capacity or inductive reactance can be removed by the same method and my application is planned to cover all cases falling under the general idea.

Figure 1 is a diagrammatic view showing the application of my invention to the interruption of a circuit.

Figure 2 is a diagrammatic view corresponding to Figure 1 showing a switch capable of carrying out the connections indicated in Figure 1.

Figure 3 is a diagrammatic view similar to Figure 2 with the parts in different position and showing a number of circuits in parallel each of which may be separately interrupted.

Figure 4 is a diagrammatic view showing mechanism for interrupting a plurality of circuits with automatic energization under the control of power-factor-operated mechanism.

Figure 4a is a diagrammatic view showing modified form of part of the construction of Figure 4.

Figures 4b and 4c are diagrammatic views showing a portion of Figure 4 with the parts in positions variant from those in Figure 4 and from each other.

Like reference characters represent similar parts in all figures.

Figure 1 is the simplest form showing the theory of my invention. The generator G is any alternating current generator supplying current for an inductive load comprising a furnance coil $X_L$ and a resistance R.

$X_c$ is a fixed capacity reactance which partly resonates the inductive reactance of the coil $X_L$. $X_{c1}$ is an additional unit of capacity reactance which can be added to or taken from $X_c$ to more nearly resonate $X_L$.

$X_{L1}$ is a special reactance tuned to resonate $X_{c1}$. Where the reactance to be withdrawn is inductive, instead of capacitive reactance such as $X_{c1}$, the tuning reactance will be capacitive, instead of the inductive reactance $X_{L1}$.

Switches 1 and 2 are diagrammatic switches so placed as to carry out the sequence of operation.

To insert $X_{c1}$ switch 1 is closed, throwing $X_{c1}$ directly in parallel with $X_c$. In closing this switch, switch 2 is open and no difficulty is encountered.

When it is subsequently desired to cut out the reactance $X_{c1}$ the current through the switch 1 may be too great to permit opening the switch without serious arcing and before opening switch 1 I close switch 2. This forms a parallel tuned or resonated circuit to be effected between $X_{c1}$ and $X_{L1}$, a wave trap, which reduces the current in switch 1 to a very low value.

A correctly resonated wave trap offers a very high resistance to currents of the frequency at which the trap is tuned. Switch 1 may now be opened and immediately after, switch 2 may be re-opened.

The capacity reactance is thus added to or taken from the line for power factor correction and no arcing or ill effect is set up in the operation.

Figure 2 shows a manually operated switch for carrying out the sequence of operations just described. It is illustrative of a convenient and practical form but which is one form only of many which can be used. Some form of timed contactors will probably be used.

The switch illustrated comprises split blades 2′, 1′ having a common pivot, spring retracted together and cooperating with the three contacts 3, 4 and 5. To add $X_{c1}$ to the circuit the switch handle is pushed to the right. Both sections are together and after contact is broken at 3, one or both of the sections make contacts 4 and 5. This puts $X_{c1}$ in circuit.

In the normal position of the switch during operation of the furnace having inductor coil reactance $X_L$, both of the switch blades lie at the right leaving the contact 3 open and connecting the capacity $X_{c1}$ across from the line 6 to the line 7 through contacts 4 and 5 closed by blade 2′ and the connection 7′.

To remove the capacity $X_{c1}$ from the circuit, the switch handle upon blade 2′ is thrown to the left from its normal position so as to cause the blade 2′ to engage contact 3 without disconnecting blade 1′ from contacts 4 and 5. Since blades 2′ and 1′ are electrically connected, the inductance $X_{L1}$ is thus connected between the line 6 and the contact 4 completing a wave trap and substantially shutting off the flow of current across from the line 6 to the line 7 through the condenser.

As soon as blade 2′ has engaged contact 3, completing the wave trap, the circuit to line 7 can be opened and this is done by movement of the blade 1′. The movement of this blade can be effected by continued movement of the blade 2′, either through mechanical engagement of the heels of the blades at $2^2$ or by increase of tension of the spring by which the two switch blades are normally kept in parallel positions.

In either event the switch blade 1′ ultimately snaps over to the dotted position at the left of Figure 2 opening the connection with line 7, first by a disconnection from contact 5 and subsequently opening the wave trap by disconnection from contact 4.

When the parts are reset the blades 2′ and 1′ are moved in clockwise direction from the position at the left in Figure 2, where the one blade is shown in full lines and the other in dotted lines. During their clockwise movement they do not separate. Blade 1′ engages contact 4 and subsequently contact 5. The engagement between blade 2′ and contact 3 is broken during the clockwise movement of the blades and this disconnection of the blade from contact 3 must take place before contact 4 is made.

Figure 3 shows how a single coil $X_{L1}$ can be used to remove any number of condensers from the circuit so long as substantially equal values of capacity reactance $X_{c1}$, $X_{c2}$, $X_{c3}$ are used at each operation. Though the reactances are preferably substantially equal they may be made up in any number of unit reactances to total the amount.

The only change from Figure 2 is that required to connect the single reactance coil $X_{L1}$ across any one of the condenser units during its disconnection from across the inductive load. This will be very clear by comparing Figure 3 with Figure 2.

My method and apparatus are thus capable of operation by hand switches or by distant control, in an order selected by the hand operator or by automatic actuation whether predetermined or contingent upon other methods or apparatus,—by single switches or by switches whose movement maintains the order of closing and opening of the circuits.

For the purpose of showing the best application of my invention known to me, as called for by the statute I illustrate the invention in a setting where successive reactances are inserted or removed, step by step automatically in agreement with power factor variation which is thus corrected. Such mechanism is broadly old but I believe that I am the first to provide a system in which the withdrawal of reactance units thus can be effected substantially without arcing.

Figure 4 shows diagrammatically structure for obtaining completely automatic correction of power factor, using the method illustrated in Figures 1 to 3 inclusive. It is a diagrammatic representation of a device for correcting the power factor in a furnace circuit, the device being operated by phase displacement, and the figure omitting the connections by which phase displacement is effective to produce mechanical movement. This figure is an application of my invention to a power-factor-corrective system described and claimed by Edwin F. Northrup in his application for "Method and apparatus for correcting power factor" Ser. No. 170,782, filed February 25, 1927.

Figure 4a is a diagrammatic illustration of connections by which phase displacement effects mechanical movements of different directions according to the direction of phase displacement.

Figures 4b and 4c are diagrammatic views showing the contacts of Figure 4 closed when leading and lagging displacement respectively have taken place.

Where for convenience of language I speak of a phase meter or power factor meter it is to be understood that I refer to a mechanism by which a selector or director or contact maker responds to the leading or lagging character of a current to direct the correction required by the phase displacement. The mechanism may be operated in a variety of ways.

In the particular embodiment shown in Figure 4, I have applied the circuits of a very desirable form of phase meter, showing a conventional single phase power factor meter to operate a contactor to insert capacity units in parallel across a furnace circuit or to withdraw these capacity units as required.

In Figure 4 I show a conventional power factor meter omitting the phase-responsive connections and showing the selector element only, corresponding to the needle of the power factor meter.

Conventional connections appear in Figure 4a, where the current coils 11 and 11' are fed from the secondary 12 of a current transformer about the furnace circuit and the potential coils 13 and 14 are fed through reactance 15 and resistance 16 from the secondary 17 of a potential transformer thrown across the furnace supply leads 6 and 7 extending from the generator to the furnace coil $X_L$ and to the capacity $X_c$ by which part of the reactance of the furnace coil is compensated.

The needle 10, as explained, may be responsive to any other phase control and may even have a different character of movement provided it controls the insertion or removal of units capable of correcting the power factor and bringing the movable element again to the position which has been selected as its neutral position.

Evidently the character of controller can be greatly varied. In the one shown, intended to cooperate with a swinging needle, movable contacts 20 and 21 pivoted at 20' and 21' are adapted to lie normally below fixed contacts 22 and 23. A plunger 24 is lifted at frequent intervals, in practice preferably many times a minute, by a cam 25 upon a shaft 26 operated by a motor 27. The motor is supplied by any suitable source of current, here indicated as alternating.

The plunger is guided at 28 to move between the full-line and dotted-line positions shown.

In the neutral zone or position the needle 10 lies beneath the space 29 between the ends of contacts 20 and 21. When the needle is in this neutral zone raising the plunger from the dotted position to the full position of Figure 4 merely lifts the needle as shown without engaging or requiring that the needle engage the contacts.

When the current in the furnace supply circuit 6 and 7 is leading beyond the intended permissible limit, the needle 10 moves to one side—let us say to the left as in Figure 4c— so as to lie beneath the contact 20.

When the plunger is next raised by the cam 25 the needle is no longer in position to be lifted within the space 29 but is pressed upwardly against and thus lifts the contact 20 causing it to engage contact 22.

Correspondingly, as shown in Figure 4b, if the current be lagging the needle is deflected to the right and raising the plunger will cause the needle to be lifted against and hence to lift the movable contact 21 so that it will engage contact 23.

When the plunger is next raised by cam 25 the needle is no longer in position to be lifted within the space 29 but is pressed upwardly against and thus lifts the contact 20 causing it to engage contact 22. Correspondingly, as shown in Figure 4b, if the current be lagging, raising of the plunger will cause the needle to be lifted against and hence to lift the movable contact 21 so that it will engage contact 23.

In Figure 4, when the parts are in the positions shown in Figures 4b and 4c, circuits are closed from a source of current 30 through conductors 31 and 32 and through one or the other of oppositely wound fields 33 and 34 of motor 35 causing it to rotate the motor armature and to rotate any suitable gearing by which a distributor switch 36 is turned in opposite directions according to the field through which the current is passed.

Figure 4b position corresponds to a lagging current from the generator. The circuit is then closed (Figure 4) through conductor 37. Figure 4c corresponds to a leading current. In it the circuit is closed through conductor 37'.

Each impulse through contacts 20 and 22 or through contacts 21 and 23 will, therefore, result in a short rotary movement of the motor armature but the rotation will be one way or the other depending on the contacts closed, which in turn depend on whether the current phase leads or lags the impressed voltage.

For convenience of diagrammatic illustration I have shown belt and pulley gearing from the motor 35, using pulleys 38, 39, 40 and 41 connected by belts 42 and 43, to turn the switch throwing arm 44 of switch 36.

The distributor successively engages the outer ends of the switch levers 45, closing or opening them, one at a time.

The inner ends of the pivoted switch levers 45 respectively engage contacts 46, 47, 48, 49, 50 and 51 whereby electrical connections are made by conductors 52, 53, 54, 55, 56 and 57 with individual electromagnets 58, 59, 60, 61, 62 or 63. These circuits are completed through conductors 64 and 65 and a source of energy 66.

Two of the switches are shown in position for throwing in condensers and one is shown in position for removing condensers. Clockwise rotation of the arm inserts and counter-clockwise rotation removes condensers from the line.

The several parallel circuits containing capacity and controlled by power-factor-directed mechanism afford an effective automatic control of the power factor which is self-corrective and which operates step by step in the sense that the units are inserted and withdrawn one at a time. Any desired approach to uniform change of corrective capacity may be secured by adjustment of the number and size of the units.

If the lever arm is rotated clockwise to throw in the bank of condensers 67 the switch arm makes connection with contact 50. This energizes magnet 63 from conductor 65 through contact 50, through contact 68 normally closed but open when magnet 62 is energized, through the magnet 63, conductor 64 and back to the source of energy.

Energizing magnet 63 closes contacts 71 and 72 which connect the condensers 67, fused at 73, in parallel with the furnace coil.

Energizing the magnet 63 also closes the contact 69 to prepare the opening circuit. This circuit will be closed if the lever arm is rotated back anticlockwise to make contact with the member 51, the current then flowing from conductor 64 through magnet 62, contact 69 to contact 51. When the power factor changes so as to make the live current lead the generator voltage, the arm is switched back to make contact with the member 51 and the connection is complete through conductor 65 back to the source.

The contact 70 is closed when the magnet 63 is energized and affords a direct path from contact 68 to the conductor 65, thus insuring the magnet 63 against being de-energized in the interim that the lever is passing from contact 50 to contact 51.

The contact 70 is a short circuit around the lever and contact 50.

If now the lever arm 44 of selector 36 be moved so as to remove the bank of condensers 67 it is returned to make contact at 51. Because of the short circuiting contact 70 just described nothing will happen until contact 51 is completed.

Current then will pass from the source through conductor 65, contact 51, conductor 57, contact 69, held closed while magnet 63 is still energized, through magnet 62, conductor 64 and back to the source.

This energizes magnet 62 closing contact 74 and opening contact 68. Contact 74 momentarily places $X_{L1}$ in parallel with the condenser bank 67, thus forming a wave trap which cuts down the current in contacts 71 and 72. When the contact 68 opens, the magnet 63 becomes de-energized allowing the contacts 69, 70, 71 and 72 to open.

The contact 72 of this group is arranged to open first, the spring causing it to open being adjusted to a slightly higher tension.

As the contact 72 is opened the condenser 67 is removed from the line and contact 71 then breaks the parallel connection to the coil $X_{L1}$.

Contact 70 opening takes the short circuit off of the main control contact 50 and opening contact 69 breaks the curent causing magnet 62 to become de-energized. Contact 74 re-opens and contact 68 re-closes preparing the device for throwing in condensers 67 when next required.

Similar contactor action attends the insertion of condensers $X_{c2}$ and $X_{c3}$ or as many others as the selector switch is designated to control.

Whatever the character of the power factor correction, whether by the insertion or removal of capacity or inductance, I provide for automatic corrective operation set in motion by deviation in phase between the supplied current and electromotive force.

The correction takes place after each departure of the needle from its mid position, here considered as corresponding to unity power factor, and results in inserting and continuing to insert in successive steps or removing and continuing to remove in successive steps corrective units at intervals of plunger operation until neutral power factor has been restored.

The neutral position of the needle actually may represent any desired power factor.

The step-by-step power-factor-controlled actuation of switches is not in itself my invention but is used to show that my invention is suitable for carrying out safely and without arcing the disconnection hitherto performed by this mechanism very much less perfectly by reason of the arcing present.

Whatever the circuit I secure removal of condensers or inductance from a power circuit without arcing by first substantially balancing the reactance to be removed and thus cutting down the current through the parallel branches by what might be compared to a high resistance, and then opening the circuit while the current is very low so there will, consequently, be no appreciable arc.

I have also combined my method and structure with existing power-factor-controlled selector equipment.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of removing successive reactances forming part of a larger body of reactance from an alternating current system which consists in first paralleling the particular reactance to be removed by a resonating reactance of the opposite phase characteristic (inductive or capacitative), subsequently breaking the circuit to the parallel branches thus formed and finally opening the connection between the reactances resonated and repeating the operation with the same resonating reactance for the other reactances to be removed, maintaining some reactances of the larger body in continued operation during removal of the successive reactances.

2. In an automatic power factor control system for furnaces, a circuit including a coil having variable reactance load, capacity across the coil circuit to balance part of the reactance of the coil, in parallel, a plurality of capacity units, means to connect the capacity units across the coil or to disconnect them and step-by-step power-factor-variation-operated means for balancing the capacity units in parallel one at a time and for interrupting the circuit through each of the capacity units in turn while it is balanced.

3. In an alternating current circuit having a reactive load of varying reactance and a paralleled reactance adapted to resonate part of the reactance of the load, an additional reactance adapted to be included in parallel with the load or excluded from the circuit to resonate a further part of the reactance of the load, a second additional reactance adapted to resonate in shunt the first additional reactance to form a wave trap, means for connecting the reactances and disconnecting them and means for interrupting the circuit through the wave trap branches formed by the additional reactances while these additional reactances are connected.

4. In an electric circuit, a bank of reactors of similar character (inductive or capacitative) arranged in parallel branches of the circuit, the reactance of each reactor being substantially equal, a reactor of opposite character to said reactors whose reactance is substantially equal to the reactance of one of said reactors and automatic means for shunting the opposite reactor selectively across any one of said reactors, forming a resonant loop including the opposite reactor and one of said reactors and for opening the circuit of the parallel branch outside of said loop subsequent to the formation of said loop.

5. In an electric circuit, a bank of reactors of similar character (inductive or capacitative) arranged in parallel branches of the circuit, the reactance of each reactor being substantially equal, a reactor of opposite character to said reactors whose reactance is substantially equal to the reactance of one of said reactors and automatic means responsive to change in power factor in the circuit for shunting the opposite reactor selectively across any one of said reactors, forming a resonant loop including the opposite reactor and one of said reactors and for opening the circuit of the parallel branch outside of said loop subsequent to the formation of said loop.

6. In an electric circuit, a furnace inductor coil, a bank of capacitors in parallel branches, resonating the furnace inductor coil, the capacitative reactances of the capacitors being substantially equal, a source of alternating current, connections from the source to the furnace inductor coil and to the capacitors placing the capacitors in parallel with the inductor coil and with one another, an inductor whose inductive reactance is substantially equal to the capacitative reactance of one of the capacitors, means for shunting the inductor across any one of the capacitors selectively, forming a resonant loop including the inductor and said one capacitor and means for breaking the circuit of each parallel branch outside of said loop.

7. In an electric circuit, a bank of reactors of similar character (inductive or capacitative) arranged in parallel branches of the circuit, the reactance of each reactor being substantially equal, a reactor of opposite character to said reactors whose reactance is substantially equal to the reactance of one of said reactors, means for shunting the opposite reactor selectively across any one of said reactors, forming a resonant loop including the opposite reactor and one of said reactors and switch means for opening the circuit of each parallel branch outside of said loop.

8. An electric circuit comprising a source of alternating current, an induction electric furnace having an inductor coil, connections from the source to the furnace inductor coil, a bank of capacitors, connections placing the capacitors in parallel branches in parallel with the furnace inductor coil, inductance of proper magnitude to resonate one of the capacitors at the frequency of the source, a loop including the inductance and said one capacitor, switch means in the loop and switch means in the parallel branch of said one capacitor outside the loop.

FRANK T. CHESNUT.